Figure 1:
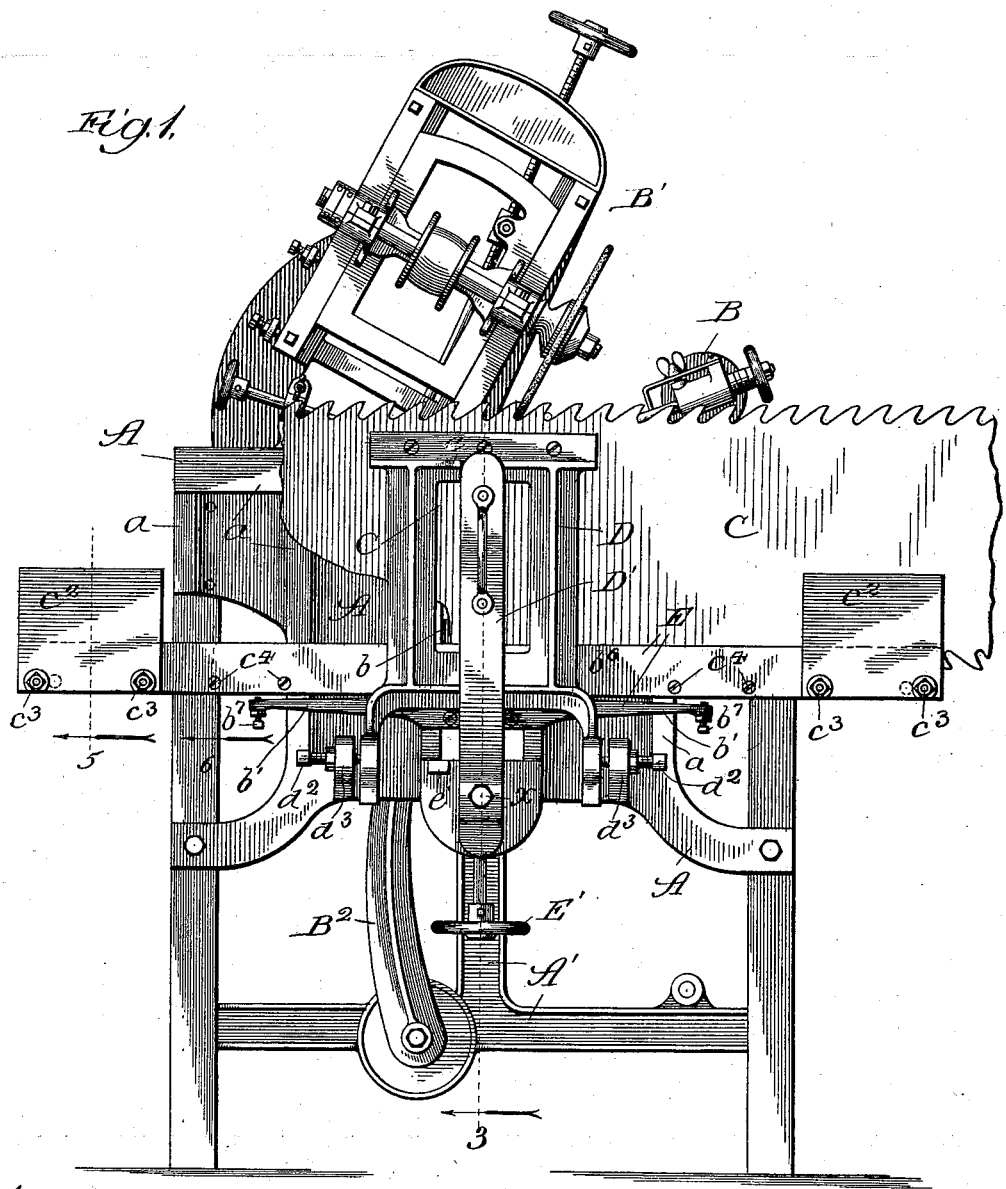

No. 654,843. Patented July 31, 1900.
H. P. SCHOFIELD.
SAW SUPPORT AND GUIDE.
(Application filed Mar. 24, 1900.)

(No Model.) 2 Sheets—Sheet 1.

Witnesses:
Inventor:
Henry P. Schofield,
By Dyrenforth, Dyrenforth & Lee,
Att'ys.

No. 654,843. Patented July 31, 1900.
H. P. SCHOFIELD.
SAW SUPPORT AND GUIDE.
(Application filed Mar. 24, 1900.)
(No Model.) 2 Sheets—Sheet 2.
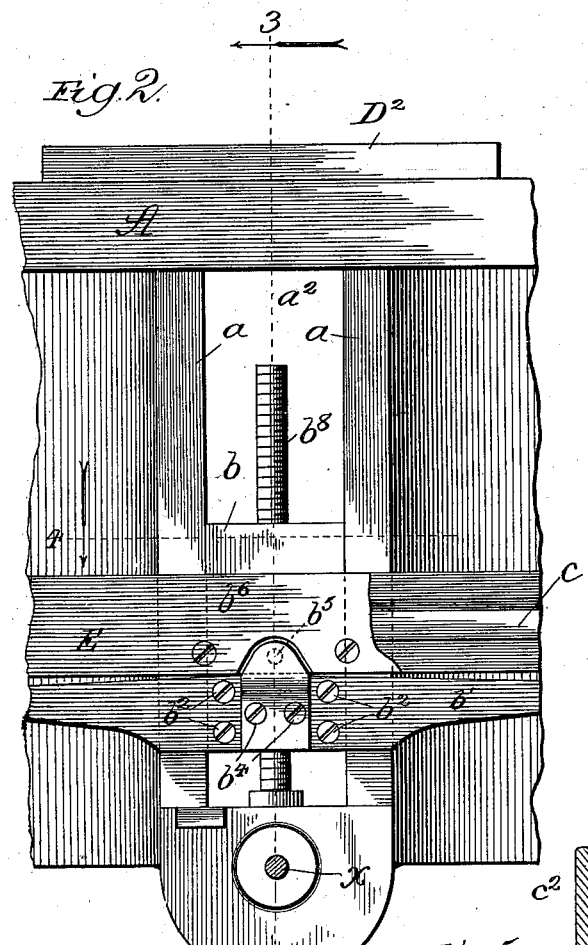
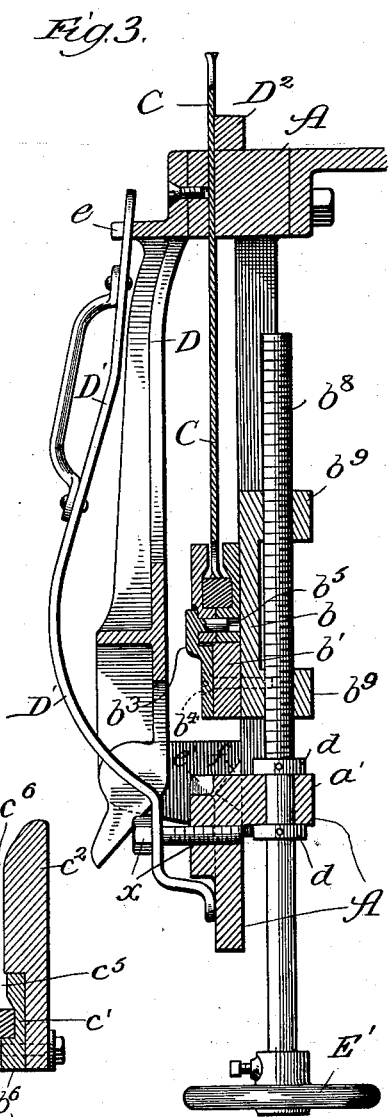
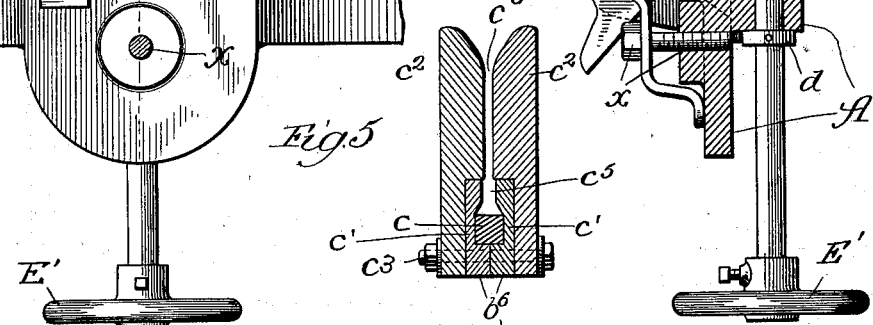
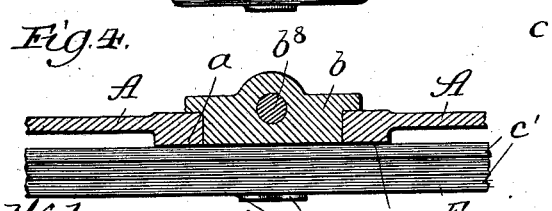
Inventor:
Henry P. Schofield,

UNITED STATES PATENT OFFICE.

HENRY P. SCHOFIELD, OF CHICAGO, ILLINOIS, ASSIGNOR OF ONE-HALF TO L. L. FILSTRUP, OF SAME PLACE.

SAW SUPPORT AND GUIDE.

SPECIFICATION forming part of Letters Patent No. 654,843, dated July 31, 1900.

Application filed March 24, 1900. Serial No. 9,998. (No model.)

*To all whom it may concern:*

Be it known that I, HENRY P. SCHOFIELD, a citizen of the United States, residing at Chicago, in the county of Cook and State of Illinois, have invented a new and Improved Saw Support and Guide, of which the following is a specification.

My invention consists in an improved saw support and guide for use in connection with saw-sharpening machines.

My primary object is to provide a device of this nature adapted for use with double-toothed band-saws—that is, saws having teeth on both edges.

A further object is to adjustably connect a guide of the improved construction to a saw-sharpening machine.

Automatically-acting saw-sharpening machines serving to feed a saw through or past a machine and grind the teeth, are well known in the art. It is common to carry the saw around the machine during the grinding operation, one guide being provided at the machine and other independent guides being arranged at suitable intervals about the machine. The present application will describe and claim my improved saw support and guide as applied to a grinding-machine, with only the most general reference to any means for advancing the saw and grinding the teeth. In application, Serial No. 9,999, filed March 24, 1900, I show a complete machine of this nature embodying certain improvements in the feeding mechanism which are claimed in said application.

In the accompanying drawings, Figure 1 is a view in front elevation of a saw-sharpening machine of common general construction, but equipped with my improved adjustable guide shown supporting a fragment of a double-toothed saw; Fig. 2, an enlarged broken view of a portion of the front of the machine and the adjustable supporting-guide, certain parts being removed; Fig. 3, a broken vertical longitudinal section taken as indicated at lines 3 of Figs. 1 and 2; Fig. 4, a broken horizontal section taken as indicated at line 4 of Fig. 2; and Figs. 5 and 6, transverse sections of the guide, taken as indicated at the corresponding lines on Fig. 1.

A represents the front end of the frame of the machine; A', the rear end thereof; B, a portion of the mechanism for advancing the saw; B', a portion of the grinding mechanism; $B^2$, a rock-arm for moving the saw-advancing or feed mechanism at B; C, a fragment of a saw; D, a swinging guide-piece of common construction; D', a spring-clamp pivoted at $x$ and serving to hold the guide-piece D yieldingly against the saw; $D^2$, a steel guide-strip secured to the top of the frame-front A; E, a supporting-guide of improved construction adjustably connected with the front of the frame, and E' a hand-wheel for raising and lowering said supporting-guide.

The front A of the frame is shown provided on its outer surface with ribs $a$ and on its inner surface at its lower central portion with a rib or lug $a'$, Fig. 3. The front is also provided with a vertical guide-channel $a^2$, as clearly shown in Fig. 2.

The adjustable supporting-guide E comprises, preferably, a block or slide $b$, moving in the guide-channel $a^2$, a horizontally-disposed stop-bar $b'$, fixedly secured centrally to the block $b$ by screws $b^2$, a pivot-yoke $b^3$, attached to the bar $b'$ by screws $b^4$ and provided with an inwardly-projecting pivotal stud $b^5$, a self-adjusting horizontally-disposed supporting guide-bar $b^6$, provided with a channel for the saw, set-screws $b^7$, affording stops for limiting the movement of the bar $b^6$ on its pivotal point, and a stem $b^8$, having threaded connection with lugs $b^9$, on the block $b$ and equipped with the hand-wheel E'.

The guide-bar $b^6$ is shown in cross-section in Figs. 5 and 6 as comprising a tempered-steel saw-bearing strip $c$, of square cross-section, flanked by recessed bars $c'$, which receive the strip $c$ and project above it to afford flanges, and wooden flange-blocks $c^2$, recessed to fit over the strips $c'$. The parts are secured together by bolts $c^3$ and screws $c^4$. The flange-forming portions of the strips $c'$ are separated by a space $c^5$, wider at the bottom of the groove than at the top thereof to prevent the lower saw-teeth from contacting with the side walls of the groove. The blocks $c^2$ are separated by a slightly-narrower space $c^6$ and serve to direct the saw in entering the groove formed by the metallic flange members $c'$.

The screw $b^8$ is provided, Fig. 3, with thrust-collars $d$, which embrace the lug $a'$, through which the stem of the screw passes. The upper surface of the bar $b'$ is a double incline, with the apex or ridge directly beneath the pivotal point of the bar $b^6$, thus allowing freedom of movement to the bar $b^6$ within the limits fixed by the set-screws $b^7$.

The guide-piece D is pivoted on points of screws $d^2$, passing through lugs $d^3$, projecting from the lower portion of the front end of the frame. The movement of the spring $D'$ on its pivot is limited by lugs $e$ and $e'$. In Fig. 3 is shown a lug $f$, which limits the downward swinging of the part D. The arms at the lower end of the piece D whereat said piece is pivoted extend below said pivot and at an angle to the upper portion of the guide-piece. The lug $f$ is in position to be engaged by one of said arms when the guide is thrown down.

The method of inserting the saw is well understood in machines of the general character described. The wooden blocks $c^2$ guide the saw to its proper channel, where it rests upon the steel channel-bottom $c$ of the guide-bar $b^6$. In feeding the saw slides on said channel-bottom. The flange-blocks $c^2$ and the upper margins of the flange members $c'$ bear against the body of the saw and prevent the teeth on the lower edge from digging into the sides of the channel. The saw is advanced tooth by tooth and ground in the ordinary manner. The channel-bottom is preferably, though not necessarily, of hardened steel. The strip $c$ is not necessarily made in a single length. Preferably it is of square cross-section.

As shown in Fig. 1, a small space is left between the points of the set-screws $b^7$ and the lower surface of the bar $b^6$ to permit the bar to adjust itself within limits.

What I claim as new, and desire to secure by Letters Patent, is—

1. In a saw-sharpening machine, the combination with the frame thereof, of a self-adjusting pivotally-supported saw-supporting guide-bar connected with the frame and provided with a bearing for the saw-teeth, and stops for limiting the movement of said bar on its pivot, substantially as and for the purpose set forth.

2. In a saw-sharpening machine, the combination with the frame thereof, of a vertically-movable slide connected with the front end of the frame, means for adjusting said slide, a guide-bar pivotally connected to said slide, and stops carried by said slide for limiting the movement of said guide-bar on its pivotal point, substantially as and for the purpose set forth.

3. In a saw-sharpening machine, the combination with the frame thereof, of a vertically-movable slide connected with the front end of the frame, means for adjusting said slide, a stop-carrying bar fixedly secured to said slide, stops thereon, and a guide-bar pivotally supported from said slide and limited in movement on its pivot by said stops, substantially as and for the purpose set forth.

4. In a saw-sharpening machine, the combination with a frame provided at its front end with a vertical guide-channel, a slide movable in said channel, a stop-bar secured to said slide, adjustable stops connected with said bar, a guide-bar pivotally supported from said slide and limited in movement by said stops, and means for raising and lowering said slide, substantially as and for the purpose set forth.

5. In a saw-sharpening machine, the combination with a frame provided at its front end with a vertical guide-channel, a slide movable in said channel, a stop-bar secured to said slide, stops carried by said bar, a guide-bar pivotally supported from said slide and limited in movement by said stops, and a screw connected with slide and frame for adjusting the slide, substantially as and for the purpose set forth.

6. In a saw-sharpening machine, the combination with a frame provided at its front end with a vertical guide-channel, of a slide movable in said channel, means for adjusting the slide, a stop-bar $b'$ fixed to said slide, a pivot-yoke $b^3$ fixed to said bar $b'$ and provided with a stud $b^5$, a guide-bar pivoted on said stud, and stops on the bar $b'$ for limiting the movement of the guide-bar, substantially as and for the purpose set forth.

7. In a saw-sharpening machine, the combination with the frame, of a self-adjusting pivotally-supported guide-bar provided with a channel of sufficient width at the bottom to receive the lower edge of a saw freely and of less width some distance above said bottom to cause the body of the saw to be guided by the flanking walls of the narrower portion of the channel, whereby contact of the teeth at the lower edges with the side walls of the channel is avoided, substantially as and for the purpose set forth.

8. In a saw-sharpening machine, the combination with the frame, of a guide-bar provided with a channel supplied at its bottom with a separately-formed hardened-steel bearing-strip upon which the saw rests, substantially as and for the purpose set forth.

9. In a saw-sharpening machine, the combination with the frame, of a guide-bar provided with a channel of sufficient width to receive freely the lower toothed edge of a saw, and wooden flange-blocks on said guide-bar separated by a space less than the width of said channel, and serving to direct the saw into said channel without injury to the lower-edge teeth, substantially as and for the purpose set forth.

HENRY P. SCHOFIELD.

In presence of—
D. W. LEE,
A. D. BACCI.